United States Patent [19]

Anderson et al.

[11] Patent Number: 5,277,534
[45] Date of Patent: Jan. 11, 1994

[54] EXPANDABLE MAGNETIC TAPE CARTRIDGE STORAGE SYSTEM

[75] Inventors: John R. Anderson, Boulder; Kenneth L. Manes, Westminster; Thomas J. Studebaker, Boulder, all of Colo.

[73] Assignee: Storage Technology Corporation, Louisville, Colo.

[21] Appl. No.: 824,601

[22] Filed: Jan. 23, 1992

[51] Int. Cl.$^5$ .............................................. B65G 1/04
[52] U.S. Cl. ................................ 414/281; 414/331; 414/280; 414/277; 360/92; 312/107
[58] Field of Search ............... 414/273, 274, 275, 277, 414/280, 281, 282, 283, 619, 331, 222, 225, 226; 211/40, 134, 186; 360/92; 312/9.1, 9.29, 9.32, 257.1, 263, 264, 283, 108, 198, 128, 205, 107, 348.1

[56] References Cited

U.S. PATENT DOCUMENTS

| | | | |
|---|---|---|---|
| 4,742,405 | 5/1988 | Teranishi | 360/92 |
| 4,846,619 | 7/1989 | Crabtree et al. | 414/280 X |
| 4,864,438 | 9/1989 | Munro | 360/92 |
| 4,937,690 | 6/1990 | Yamashita et al. | 360/92 |
| 5,143,193 | 9/1992 | Geraci | 414/277 X |

FOREIGN PATENT DOCUMENTS

| | | | |
|---|---|---|---|
| 2482845 | 11/1981 | France | 312/107 |
| 156107 | 12/1980 | Japan | 414/280 |
| 157156 | 12/1980 | Japan | 360/92 |

Primary Examiner—Frank E. Werner
Attorney, Agent, or Firm—Duft, Graziano & Forest

[57] ABSTRACT

The expandable magnetic tape cartridge storage system is designed to handle a moderate number of magnetic tape cartridges and is expandable without the need to add an additional robotic cartridge handling mechanism. This is accomplished by the use of a base module that consists of a half cylinder of magnetic tape cartridge storage locations. A center pivot robotic cartridge handling mechanism is included in the base module in order to transport the magnetic tape cartridges between the cartridge storage locations and a plurality of magnetic tape drives included in the base module. The capacity of this cartridge storage system can be increased by adding an additional half cylinder of magnetic tape cartridge storage locations to thereby create a complete cylinder of cartridge storage locations. The robotic cartridge storage mechanism is adaptable to operate in a half cylinder or a full cylinder environment to thereby accommodate the storage capacity increase without the need for additional robotic cartridge handling mechanisms. This cartridge storage system can also be used to expand the cartridge storage capacity of an existing automated cartridge storage system in moderate increments.

5 Claims, 4 Drawing Sheets ment of the apparatus.
EXPANDABLE MAGNETIC TAPE CARTRIDGE STORAGE SYSTEM

FIELD OF THE INVENTION

This invention relates to magnetic tape cartridge storage systems and, in particular, to a robotic magnetic tape cartridge storage system that is of modular construction and can be expanded in its magnetic tape cartridge handling capacity.

PROBLEM

It is a problem in the field of robotic magnetic tape cartridge storage systems to accommodate the user's need to increase the storage capacity of the magnetic tape cartridge storage system. Existing magnetic tape cartridge storage systems are expandable in their storage capacity but the expansion capability is achieved with the extra cost of additional robotic cartridge handling apparatus and in some cases, in large segments of additional storage capacity.

U.S. Pat. No. 4,937,690 discloses a modular x-y rectilinear magnetic tape cartridge storage system used for the automated storage and retrieval of 3480-type magnetic tape cartridges for use by a plurality of magnetic tape drives. This cartridge storage system includes a base module that contains a predetermined number of magnetic tape cartridge storage locations arranged in a planar array of shelves, each of which holds a plurality of 3480-type magnetic tape cartridges. An x-y robotic cartridge handling mechanism is included to retrieve the magnetic tape cartridges from the cartridge storage locations and transport them to the plurality of tape drives that are included in the cartridge storage system. The x-y robotic cartridge handling mechanism has a predetermined range of motion which can not be expanded beyond the predetermined number of magnetic tape cartridge storage cells in the base module. In order to increase the cartridge storage capacity of this magnetic tape cartridge storage system, additional rectilinear arrays of magnetic tape cartridge storage locations can be added to the base module. The additional arrays are juxtaposed to one end of the array of cartridge storage locations contained in the base module of the cartridge storage system. These additional rectilinear arrays of magnetic tape cartridge storage locations increase the linear extent of the array contained in the base module, but require a supplementary x-y robotic cartridge handling mechanism to service these additional segments of storage locations. This additional mechanism must be included since the range of motion of the x-y robotic cartridge handling mechanism in the base module is insufficient to handle these additional segments of cartridge storage locations. The supplementary robotic cartridge handling mechanism retrieves magnetic tape cartridges from the cartridge storage locations in the supplementary segments and transports these retrieved cartridges to "mailbox" storage locations in the base module. The base module x-y robotic cartridge handling mechanism retrieves the magnetic tape cartridges placed in the mailbox locations and further transports them to the magnetic tape drives for reading and writing data thereon. In this fashion, the base module of the cartridge storage system can expand in predefined segments, but at the cost of adding a new robotic cartridge handling mechanism to service these additional segments of magnetic tape cartridge storage locations.

Another substantially cylindrical magnetic tape cartridge storage and handling system is disclosed in U.S. Pat. No. 4,864,438. This magnetic tape cartridge storage system makes use of two concentric cylinders of magnetic tape cartridge storage locations, the openings of which face into the intercylinder space. A robotic cartridge retrieval mechanism moves within this intercylinder space in order to retrieve magnetic tape cartridges from these storage locations and transport them to a plurality of tape drives for reading and writing of data thereon. The robotic cartridge handling mechanism includes a center pivot, to which is attached a rotatable positioning arm that moves in a circular direction to position the cartridge retrieval mechanism in front of a selected one of the plurality of magnetic tape cartridge storage locations. The expansion of this magnetic tape cartridge storage system is by way of connecting the base module to another module of identical size and capacity. A pass through port mechanism interconnects the two modules in order to exchange magnetic tape cartridges therebetween. A problem with this configuration is that each module stores approximately 6,000 magnetic tape cartridges and growth in cartridge storage capacity is limited to extremely large increments of increased capacity and the need for an additional robotic cartridge handling mechanism.

Therefore, prior art expandable magnetic tape cartridge storage systems require the addition of another robotic magnetic tape cartridge retrieval mechanism and, in some cases, a significant increase in the number of magnetic tape cartridge storage locations. In these systems, growth can not be accomplished inexpensively on a modular basis. These systems are therefore typically directed to very large capacity cartridge storage system applications and these architectures are inappropriate for cartridge retrieval systems that would handle a small or moderate number of magnetic tape cartridges.

SOLUTION

The above described problems are solved and a technical advance achieved in the field by the expandable magnetic tape cartridge storage system of the present invention. This cartridge storage system is designed to handle a moderate number of magnetic tape cartridges and is expandable without the need to add an additional robotic cartridge handling mechanism. This is accomplished by the use of a base module that consists of a half cylinder of magnetic tape cartridge storage locations. A center pivot robotic cartridge handling mechanism is included in the base module in order to transport the magnetic tape cartridges between the cartridge storage locations and a plurality of magnetic tape drives included in the base module. The capacity of this cartridge storage system can be increased by adding an additional half cylinder of magnetic tape cartridge storage locations to thereby create a complete cylinder of cartridge storage locations. The robotic cartridge handling mechanism is adaptable to operate in a half cylinder or a full cylinder environment to thereby accommodate the storage capacity increase without the need for additional robotic cartridge handling mechanisms. This cartridge storage system can also be used in conjunction with the above mentioned dual concentric cylindrical cartridge storage system to expand the cartridge storage capacity of that system in moderate size increments.

DETAILED DESCRIPTION OF THE DRAWING

The automated object storage system of the present invention is designed to be expandable in modular and simple fashion to enable the user to add additional object storage capacity without the need for adding an additional robotic object handling mechanism. In addition, the architecture of this object storage system is such that the base module and the expansion module are simply interconnected without the need for complex alignment procedures or additional apparatus. The expansion module simply bolts to the existing base module and the base robotic object handling mechanism can serve both the base and expansion modules without any modification thereto. The specific embodiment disclosed herein is a 3480-type magnetic tape cartridge storage system and the term cartridge is therefore used in the description in place of the term object but is not intended to limit the scope of the invention.

Figure 1:
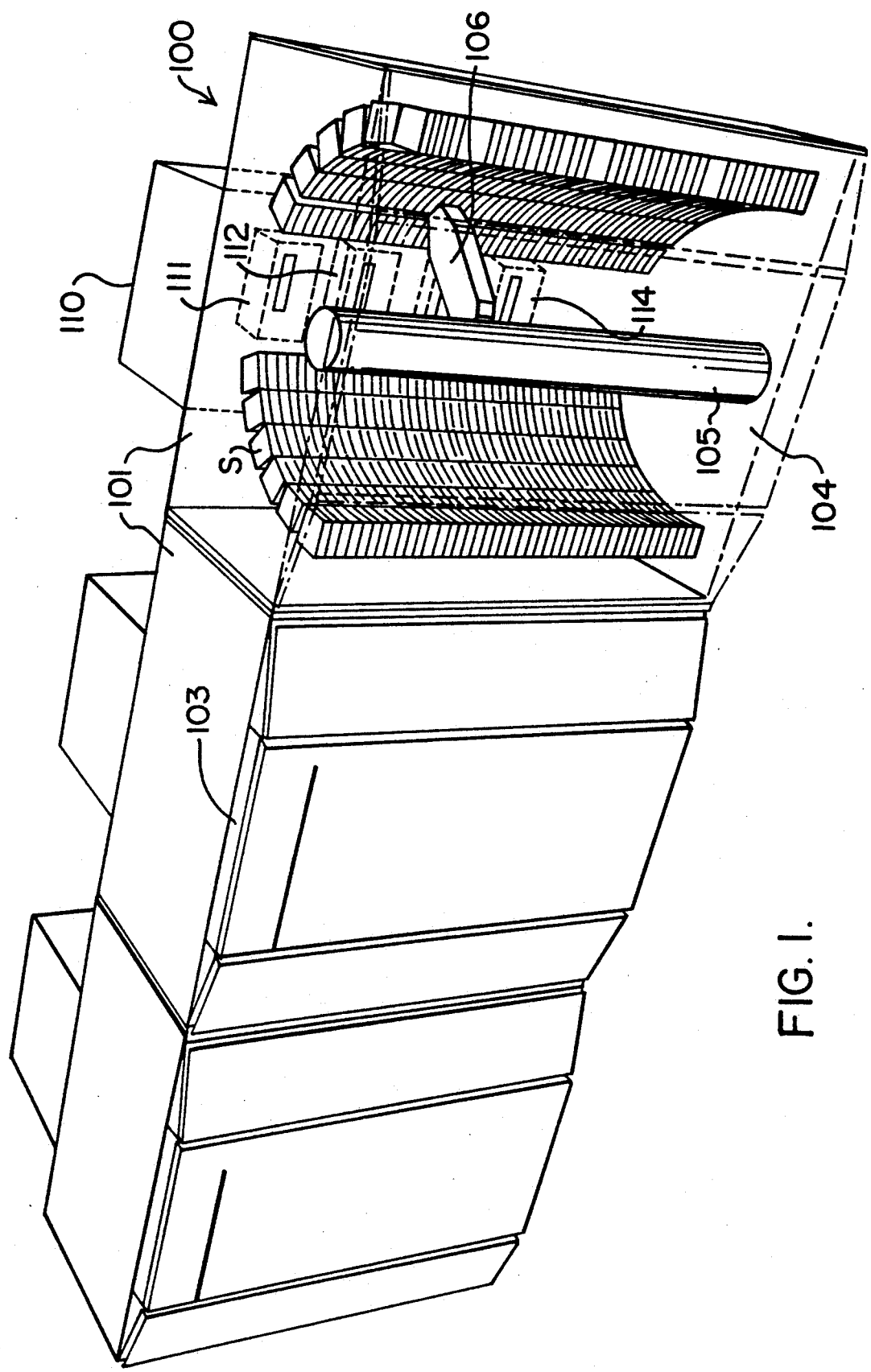
FIG. 1 illustrates a perspective view of the base module of the robotic magnetic tape cartridge storage system of the present invention.
Figure 4:
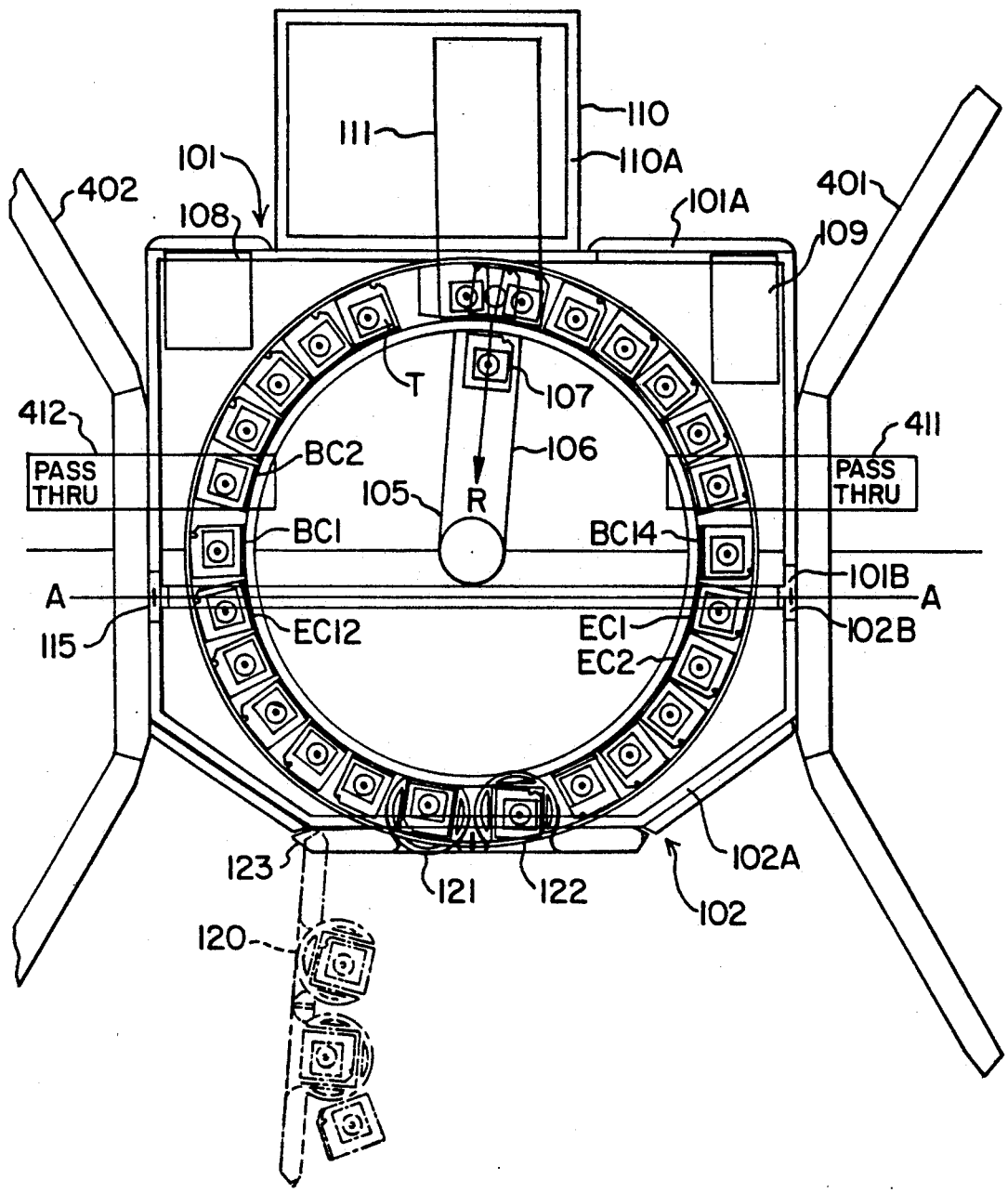
FIG. 4 illustrates the interconnection of the robotic magnetic tape cartridge storage system attached to a large automated cartridge storage system to thereby function as an expansion module.

FIG. 1 illustrates a perspective view of the base module and FIG. 4 illustrates a top view of the base 101 and expansion 102 modules of the automated magnetic tape cartridge storage system 100 of the present invention. The basic architecture of this robotic cartridge storage system 100 is that of a center pivot robotic cartridge handling mechanism 104 surrounded by a polygonal array of radially inwardly disposed cartridge storage locations (BC1 . . . , ECI . . . ) which polygonal array piecewise approximates a cylinder. In particular, the robotic cartridge handling mechanism 104 consists of a center pivot 105 with a positioning arm 106 rotatably attached thereto. A magnetic tape cartridge retrieval mechanism 107 is located at the distal end of the positioning arm 106 and consists of a finger gripper mechanism that is extendable in a radial direction (−R) to grasp a magnetic tape cartridge T stored in a selected one of the cartridge storage locations S.

A drive motor (not shown) is included in the center pivot 105 to enable the positioning arm 106 to rotate about the center pivot 105 and position the retrieval mechanism 107 in front of and juxtaposed to a selected one of the magnetic tape cartridge storage locations S in the cylindrical array of storage locations. Once the cartridge T in the selected cartridge storage location S is securely grasped by the gripper mechanism, the gripper mechanism is retracted in a radial direction (R) by a tractor mechanism to retrieve the magnetic tape cartridge T from its associated cartridge storage location S. Once the cartridge T is so retrieved, the positioning arm 106 translates the retrieval mechanism 107 to a position in front of and juxtaposed to one of the magnetic tape drives 111-114 that is included in this cartridge storage system 100. Again, the tractor mechanism is activated to extend the finger gripper mechanism, with the magnetic tape cartridge T held between its fingers, toward the selected one of the tape drives 111-114 in order to insert the magnetic tape cartridge T therein. Once the magnetic tape cartridge is firmly placed in the tape drive, the finger gripper mechanism releases its hold on the magnetic tape cartridge T and the tractor mechanism retracts the finger gripper mechanism to clear the tape drive and proceed with another cartridge transportation operation.

This basic robotic cartridge handling mechanism and its functional operation are well known in the prior art and are not disclosed in any additional detail herein. Suffice it to say that the robotic cartridge handling mechanism is rotatably operable to transport magnetic tape cartridges between their cartridge storage locations and the plurality of magnetic tape drives and cartridge input/output ports (if any) which function as a mechanism to input and output magnetic tape cartridges into this cartridge storage system. Implementation details of a robotic cartridge handling mechanism and pass thru port can be found in the above mentioned U.S. Pat. No. 4,864,438 and a cartridge access port is described in U.S. patent application Ser. No. 07/745,015.

System Architecture

Figure 3:
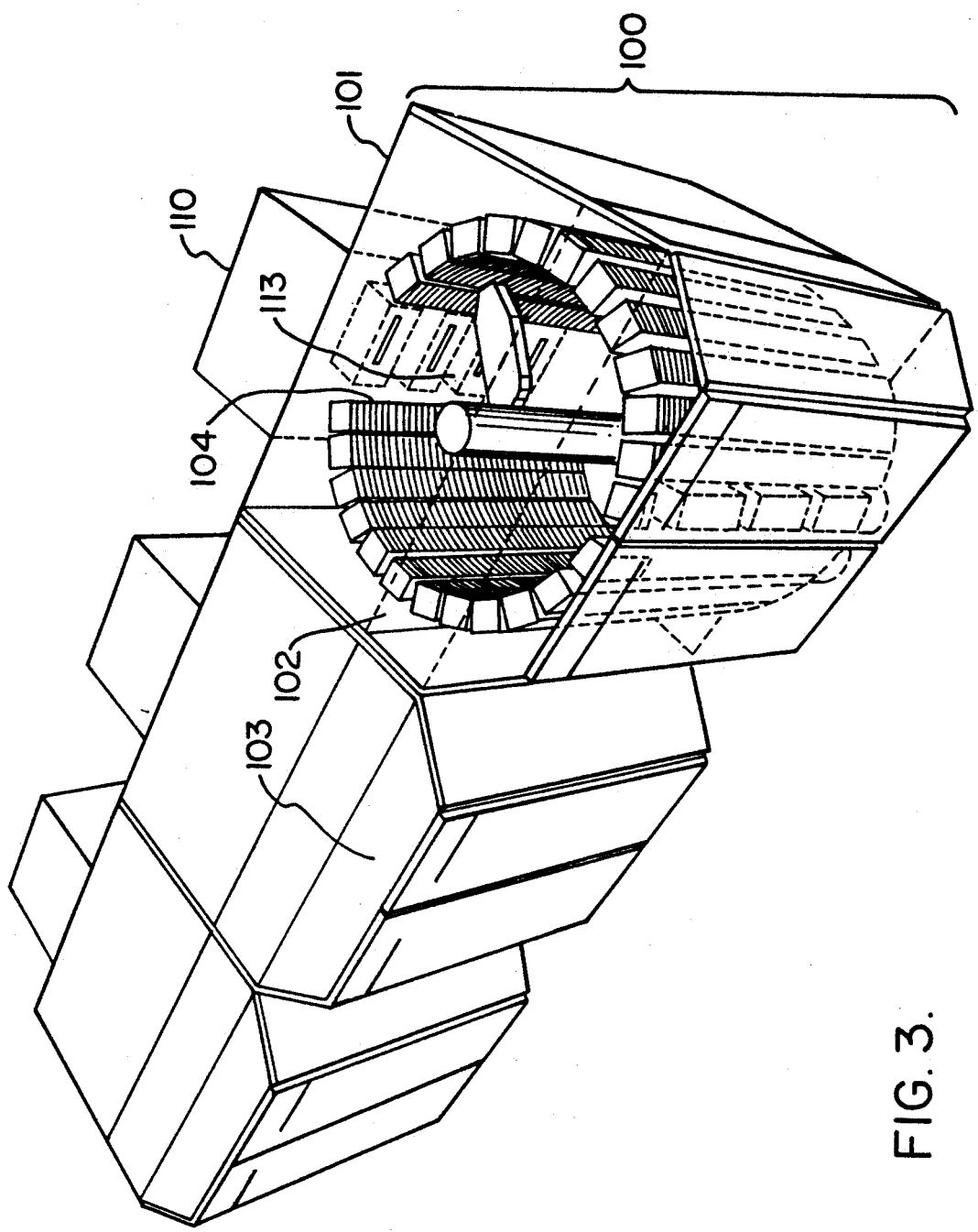

The circumference of the magnetic tape cartridge storage system 100 in a full cylindrical arrangement, illustrated in FIGS. 3 and 4, is divided into a plurality of segments BC*, EC*, each of which contains a vertical column of magnetic tape cartridge storage locations S. In the preferred embodiment disclosed herein, a full cylinder consists of twenty-six segments, twenty-four of which are used for cartridge storage locations and two of which are used to mount magnetic tape drives 111-114. In general, the number of segments is selected as a function of the radius of the retrieval mechanism positioning arm 106, the size of the objects being handled by this system and other technological constraints that are obvious to the designer. Therefore, it is obvious that the base module 101 illustrated in FIGS. 1 and 4 must include the robotic cartridge handling mechanism 104 as well as tape drives 111-114 and a plurality of cartridge storage locations S in order to perform the basic cartridge handling function described above.

In order to provide the expansion capability on a simple and incremental basis, the cylindrical array of cartridge storage locations S is substantially divided in half, with one half being in the base module 101 and one half being in the expansion module 102. In order to enable this system to make use of the single robotic cartridge handling mechanism 104, the division of the cylindrical array is not exactly into two halves, since that would require an inelegant division of the columns of cartridge storage locations BC*, EC* and an oddly shaped interface between the base 101 and expansion 102 module. In particular, by dividing the cartridge storage system 100 as illustrated in FIGS. 1 and 3, a flat surface is provided to interconnect the expansion module 102 with the base module 101. This flat surface can be covered as illustrated in FIG. 1 with a cover 103 in order to safeguard the equipment from the environment and at the same time present an aesthetically pleasing appearance to the user. The mechanical configuration that results from this division is a substantially rectangular cabinet 101a that encloses the apparatus of the base module 101. Another substantially rectangular cabinet 110a encloses the tape drives 111-114. A plurality of the half cylinder cartridge storage systems 100 are illustrated aligned in a row in FIG. 1. Additional mechanical details of the cartridge storage system 100 are evident from FIG. 4. Within cabinet 101a are also located the power supplies 108 and circuit boards 109 that are necessary to power and control the robotic cartridge handling mechanism 104. A door 120 is provided to enable a repairperson to access the cartridge handling mechanism 104 and typically two cartridge access ports 121, 122 are provided in door 120 to permit the entry or removal of cartridges into cartridge storage system. The cartridge access ports 121, 122 consist of a hinged set of cartridge storage locations that can be rotated for loading from the exterior of cartridge storage system 100. These cartridge access port cartridge storage locations normally face the interior work spare of cartridge storage system 100. Door 120 includes a hinge 123 to enable a repairperson to enter the interior of cartridge storage system 100.

Figure 2:
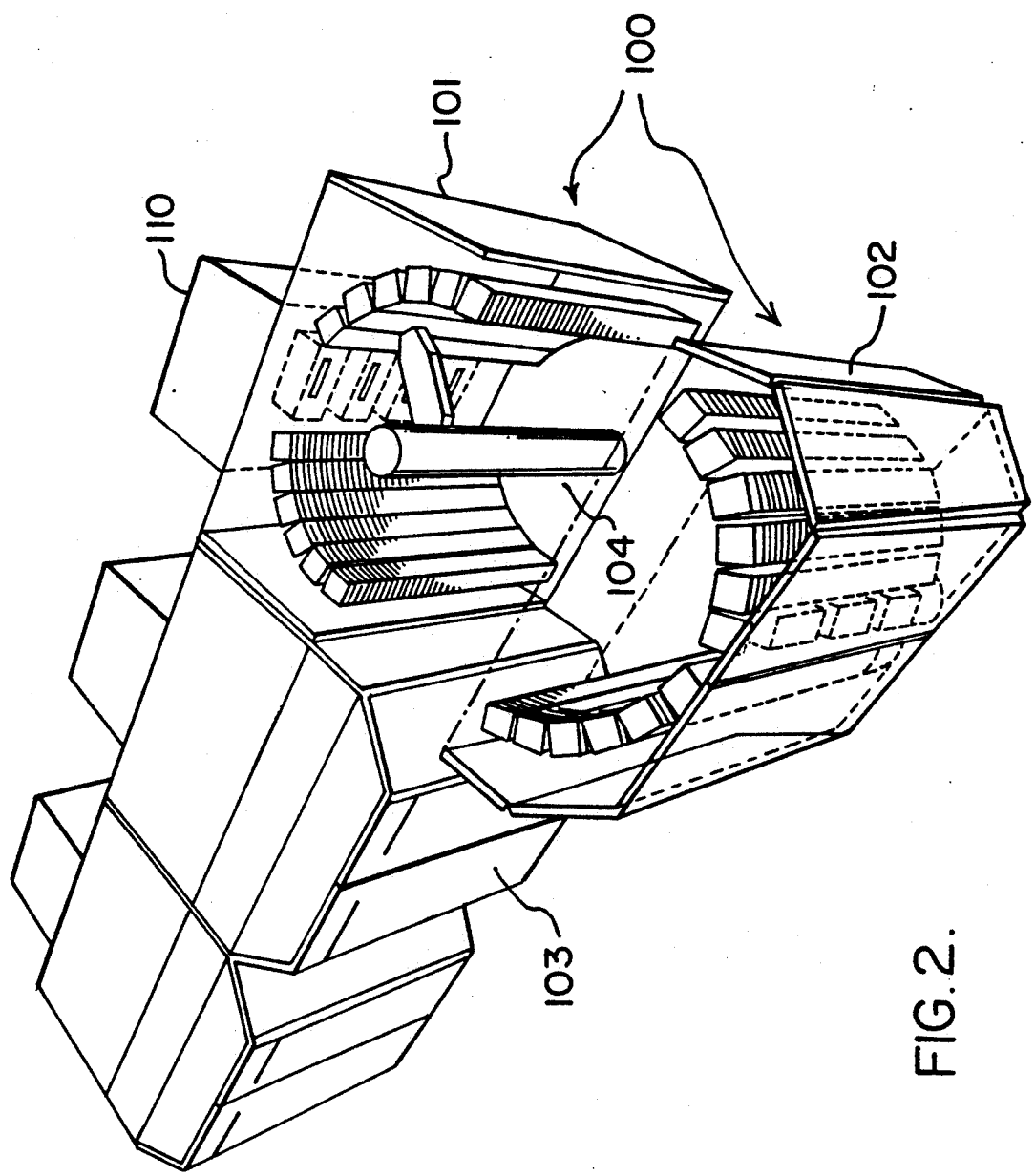
FIGS. 2 and 3 illustrate a perspective view of the base module with a supplementary cartridge storage module.

In dividing the entire cartridge storage system into base 101 and expansion 102 modules, the division is made so that the robotic cartridge handling mechanism 104 traverses a full 180° rotation in order to access cartridge storage locations in segments BC1-BC14. In the present embodiment this is accomplished by providing fourteen segments BC1-BC14 in the base module 101 and twelve segments EC1-EC12 in the expansion module 102. With a 180° rotation of cartridge handling mechanism 104, one more than one half of segments BC*, EC* are accessible by the cartridge handling mechanism 104. This enables the base module 101 to contain the tape drives 111-114 which occupy two segments BC7, BC8 and twelve cartridge storage location segments BC1-BC6, BC9-BC14. The orientation illustrated in FIG. 2 therefore permits the addition of the expansion module 102 without requiring additional robotic cartridge handling apparatus 104. By providing fourteen segments BC1-BC14 in the base module 101, as is obvious from FIGS. 1-4, the robotic cartridge handling mechanism 104 is completely enclosed in the base module cabinet 101a when the cover 103 is attached thereto. A line A—A drawn from the outside edge (facing cover 103) of the first BC1 and the last BC14 columns of cartridge storage locations in the semi-cylindrical configuration shown in FIG. 1 encloses the robot support column 105 and positioning arm 106 within the substantially half cylinder that comprises the base module 101. Therefore, the base module 101 is a self contained unit comprising a plurality of segments BC1-BC14 of cartridge storage locations and a robot retrieval mechanism 104. The cabinet 101a that encloses this apparatus contains a flange 101b on the periphery thereof juxtaposed to the first BC1 and last BC14 segments in this substantially semi-cylindrical array which flanges 101b mate with corresponding flanges 102b on the frame of expansion module 102 in order to enable the simple addition of the twelve additional segments EC1-EC12 of cartridge storage locations. Several locator pins 115 are provided on the frame 102b of the expansion module 102 in order to mate with corresponding holes (not shown) on the frame 101b of the base module 101 to align the two modules, which are then interconnected by the use of bolts to mechanically tie the two frames together. This simple interconnection arrangement mechanically adds the expansion module 102 and, a simple instruction to the controller mechanism 109 for the robotic cartridge retrieval mechanism 104 instructs the robotic cartridge handling mechanism 104 to traverse the full 360° rotation within the cylindrical array rather the 180° in the substantially semicylindrical array in order to account for the additional cartridge storage locations that have been added to this cartridge storage system 100.

Interconnection with Other Automated Cartridge Storage Systems

As can be seen from FIG. 4, the base module 101 or base 101 and expansion 102 modules together of this cartridge storage system 100 can be attached to an existing cartridge storage library, such as a 4400 Automated Cartridge System 401, 402 via the pass through port 411, 412, respectively contained therein in order to provide additional cartridge storage locations for use therein. In this configuration, the expandable semi-cylindrical cartridge storage and handling system 100 can include tape drives 111-114 or optionally may just provide the plurality of cartridge storage locations therein. The use of the expandable cylindrical cartridge storage system 100 appended the existing dual concentric cylindrical cartridge storage library 401, 402 allows incremental growth. A base module 101 can be used, which base module 101 can be supplemented by the addition of the expansion module 102 to the base semi-cylindrical module 101. In this manner, a large capacity library 401, 402 can be expanded by small growable segments via base and expansion modules 101, 102 without requiring the commitment to an entire replication of the base dual concentric cylindrical library module 401, 402. Therefore, the cartridge storage system 100 of the present invention can provide an interim growth solution for a user that is committed to the use of the 4400 Automated Cartridge System 401, 402 and solves the immediate cartridge storage capacity expansion need until the entirety of the base module 101 and the expansion module 102 of the expandable cylindrical cartridge storage system 100 is exhausted and additional capacity is required thereby justifying the addition of another 4400 Automated Cartridge System to the existing 4400 Automated Cartridge System. Therefore, the cartridge storage system 100 of the present invention provides a robotic cartridge handling mechanism of intermediate size that is growable from a base module 101 to a capacity that is essentially double of the base module 101 by the simple addition of further arrays of cartridge storage locations contained in expansion module 102 without necessitating the use of an additional robotic cartridge handling mechanism as is found in the prior art. The use of a polygonal array of cartridge storage locations, which approximate a cylinder, enables the cartridge storage system 100 to occupy a minimal floor space while also providing the possibility of interconnecting multiple modules by means of pass through ports 411, 412 as illustrated in the prior art by the 4400 Automated Cartridge System.

While a specific embodiment of this invention has been disclosed, it is expected that those skilled in the art can and will design alternate embodiments of this invention that fall within the scope of the appended claims.

We claim:

1. An expandable object handling apparatus for retrieving objects from a plurality of object storage structures, wherein a first configuration of said apparatus comprises:
   a first substantially semi-cylindrical array of said object storage structures, said first substantially cylindrical array of object storage structures having a center point and including n columns of object storage structures, each of said columns of object storage structures containing a plurality of vertically stacked radially inwardly disposed object storage structures;

means for removing one of said objects from a selected one of said object storage structures; and means, centered on said center point and rotatable about said center point, for positioning said removing means juxtaposed to said selected one of id object storage structures in a selected one of said columns of said object storage structures to retrieve said objects in a radially inwardly direction from said selected one of said object storage structures;

and wherein a second configuration of said apparatus further comprises:

a second substantially semi-cylindrical array of object storage structures, including less than n said columns of object storage structures radially disposed bout said center point, each of said columns of said object storage structures containing a plurality of vertically stacked radially inwardly disposed said object storage structures, said second substantially cylindrical array of object storage structures being juxtaposed to said first plurality of object storage structures to form a substantially cylindrical array of said object storage structures.

2. The apparatus of claim 1 further comprising:

means for rigidly interconnecting said first semi-cylindrical array and said second semi-cylindrical array of structures to form said substantially cylindrical array of structures.

3. The apparatus of claim 1 further comprising:

at least one cartridge access port means placed in at least one of said less than n said columns of object storage structures in said second semi-cylindrical array of object storage structures and radially inwardly disposed, for manually inputting and outputting said objects into/out of said expandable object handling apparatus.

4. An expandable object handling apparatus for retrieving object from a plurality of object storage structures comprising:

a first plurality of object storage structures configured in a substantially semi-cylindrical array having a center point;

means for removing one of said objects from a selected one of said first plurality of object storage structures;

means, located at said center point and rotatable about said center point, for positioning said removing means juxtaposed to said object storage structures to retrieve said objects from said selected object storage locations, wherein a first configuration of said apparatus comprises:

positioning arm means having a first end and a selection end, distal from said first end and connected to said removing means, pivot means, centered on said center point and connected to said first end of said positioning arm means, for rotating said positioning arm means bout said center point to position said removing means juxtaposed to said selected object storage locations to retrieve said objects from said selected object storage locations;

at least one means or using said objects retrieved from said object storage structures;

a second plurality of said object storage structures configured in a substantially semi-cylindrical array about said center point, juxtaposed to said first plurality of object storage structures to form a substantially cylindrical array of said object structures in said expandable object handling apparatus; and at least one access pot means located in said cylindrical array for manually inputting and outputting said objects into/out of said expandable object handling apparatus.

5. An expandable object handling apparatus for retrieving objects from a plurality of object storage structures comprising:

a first substantially semi-cylindrical array of object storage structures, said first substantially cylindrical array of object storage structures having a center point and including n columns of object storage structure, each of said columns of object storage structures containing a plurality of vertically us tacked radially inwardly disposed said object storage structures;

means for removing one of said objects form a selected one of said object storage structures;

means, centered on said enter point and rotatable about said center point, for positioning said removing means juxtaposed to said selected one of said object storage structures in a selected one of said columns of said object storage structures to retrieve one of said objects in a radially inwardly direction from said selected one of said object storage structures, comprising:

positioning arm means having a first end and a second end, distal from said first end and connected to said removing means, pivot means, centered on a center point and connected to said first end of said positioning arm means to align said positioning arm in said radial direction, for rotating said positioning arm means about said center point to position said removing means juxtaposed to said selected one of said object storage locations to retrieve said object from said selected one of said object storage locations;

a second substantially semi-cylindrical array of object storage structures, including less than n said columns of object storage structures radially disposed about said center point, each of said columns of object storage structures containing a plurality of vertically stacked radially inwardly disposed object storage structures, said second substantially cylindrical array of object storage structures being juxtaposed to said first plurality of object storage structures to form a substantially cylindrical array of object storage structures in said expandable object handling apparatus;

at least one means, placed in at least one of said columns of object storage structures and radially inwardly disposed, for using said objects retrieved from said object storage structures; and at least one cartridge access port means placed in at least one of said columns of object storage structures and radially inwardly disposed, for manually inputting and outputting objects into/out of said expandable object handling apparatus.

* * * * *